(12) United States Patent
Ko

(10) Patent No.: US 9,979,461 B2
(45) Date of Patent: May 22, 2018

(54) RF REPEATER

(71) Applicant: ADVANCED RF TECHNOLOGIES, INC., Burbank, CA (US)

(72) Inventor: Young-Hoon Ko, Icheon-si (KR)

(73) Assignee: ADVANCED RF TECHNOLOGIES, INC., Burbank, CA (US)

( * ) Notice: Subject to any disclaimer, the term of this patent is extended or adjusted under 35 U.S.C. 154(b) by 0 days. days.

(21) Appl. No.: 15/449,659

(22) Filed: Mar. 3, 2017

(65) Prior Publication Data
US 2017/0257159 A1 Sep. 7, 2017

(30) Foreign Application Priority Data
Mar. 4, 2016 (KR) .................. 10-2016-0026808

(51) Int. Cl.
| | | |
|---|---|---|
| H04B 7/14 | (2006.01) |
| H04B 7/155 | (2006.01) |
| H04B 1/00 | (2006.01) |
| H04L 25/03 | (2006.01) |

(52) U.S. Cl.
CPC ......... *H04B 7/15585* (2013.01); *H04B 1/001* (2013.01); *H04B 1/0007* (2013.01); *H04L 25/03834* (2013.01)

(58) Field of Classification Search
USPC .... 455/20, 7, 11.1, 13.1, 67.11, 63.1, 67.12, 455/67.13
See application file for complete search history.

(56) References Cited

U.S. PATENT DOCUMENTS

| 8,344,800 B2* | 1/2013 | Baik .................. H04B 7/15585 |
| | | 330/149 |
| 2006/0046644 A1* | 3/2006 | Chung ............... H04B 7/15557 |
| | | 455/11.1 |
| 2010/0109771 A1* | 5/2010 | Baik .................. H04B 7/15585 |
| | | 330/149 |

(Continued)

FOREIGN PATENT DOCUMENTS

| KR | 2009-0103538 A | 10/2009 |
| KR | 2009-0110774 A | 10/2009 |
| KR | 10-1415943 | 7/2014 |

OTHER PUBLICATIONS

Korean Final Office action for Application No. 10-2016-0026808, dated Apr. 21, 2017, 4 pages.

(Continued)

*Primary Examiner* — Fayyaz Alam
(74) *Attorney, Agent, or Firm* — Lewis Roca Rothgerber Christie LLP

(57) ABSTRACT

In a mobile communication service system, repeaters can be installed to cover shadow areas where it may otherwise be difficult to transmit and/or receive mobile signals. A radio frequency (RF) repeater that may select between an interference cancellation device and a software-defined radio (SDR) device is provided. The RF repeater can select use of the interference cancellation device in environments or situations that are relatively less complex, and can switch to use of the SDR device instead for environments or situations where more complex frequency processing may be needed and where such frequency processing may be prioritized over interference cancellation to provide better or more effective signal transmissions.

15 Claims, 11 Drawing Sheets

(56) References Cited

U.S. PATENT DOCUMENTS

2012/0322366 A1* 12/2012 Davies ............... H04B 7/15542
                                                        455/18
2015/0038071 A1   2/2015 Kang
2016/0087710 A1*  3/2016 Kummetz .......... H04B 7/15585
                                                       375/214

OTHER PUBLICATIONS

Korean Office action for Application No. 10-2016-0026808 dated Jan. 2, 2017, 5 pages.

* cited by examiner

RF REPEATER

CROSS-REFERENCE TO RELATED APPLICATION(S)

This application claims priority from Korean Patent Application No. 10-2016-0026808, filed on Mar. 4, 2016, in the Korean Intellectual Property Office, the contents of which are incorporated herein by reference in their entirety.

BACKGROUND

Field

Embodiments of the invention relate generally to a radio frequency (RF) repeater, and more particularly, to an RF repeater that may select between an interference cancellation device and a software-defined radio (SDR) device.

Description of Related Art

In a mobile communication system, repeaters are installed to cover shadow areas. Among such repeaters, there may be repeaters that do not have an interference cancellation function. In a case in which signals between input and output antennas of the repeater are not isolated, a signal output from the output antenna is fed back to the input antenna of the repeater, whereby oscillation is caused by the feedback signal. In this example, signals may not be serviced smoothly and products may be damaged. When such a repeater is installed in an environment where oscillation occurs, the repeater decreases an output strength and outputs low-strength signals, which may create other shadow areas.

To solve such issues, where appropriate, existing interference cancellation repeaters or systems can be used. However, due in part to the addition of an interference cancellation function, such existing interference cancellation systems may have restricted resources for digital signal processing and limits of sampling, and thus may not be installed effectively, may not operate properly, and/or may not perform an interference cancellation function properly, in a frequency environment where various preferred frequency signals and non-preferred frequency signals coexist in a wide band.

SUMMARY

Various embodiments of the invention provide an RF repeater for addressing the above issues, among others.

An aspect of the invention provides a repeater that may use an interference cancellation device to secure a service radius irrespective of an insufficient distance between antennas in a suburb or island area where a frequency environment is relatively less complex, and/or may select a software-defined radio (SDR) device suitable for an urban environment when complex frequency processing takes priority over interference cancellation in a service environment where a frequency environment is relatively complex, like an urban or a dense urban area.

According to an aspect of the invention, there is provided a radio frequency (RF) repeater including an RF down-converter configured to receive an analog signal and perform frequency down-conversion, a digitizer configured to perform digital signal processing, and an RF up-converter configured to perform frequency up-conversion to generate a signal with a frequency equal to that of the received analog signal and to transmit the generated signal.

The digitizer may include an interference cancellation digitizer configured to perform interference cancellation, and an SDR digitizer configured to filter and process a complex frequency.

The interference cancellation digitizer may include an analog-to-digital converter (ADC) configured to convert an analog signal into a digital signal, an interference cancellation digital processor configured to determine whether a feedback signal is present by analyzing a correlation between the digital signal and a temporary previously transmitted signal, and to cancel the feedback signal when the feedback signal is present, and a digital-to-analog converter (DAC) configured to convert a signal output from the interference cancellation digital processor into an analog signal to be transmitted.

The SDR digitizer may include an ADC configured to convert an analog signal into a digital signal, an SDR digital processor configured to block a frequency signal component of an unnecessary channel in the digital signal and to allow a frequency signal component of a necessary channel in the digital signal to pass through digital filtering, and to perform channel equalization through channel level control, and a DAC configured to convert a signal output from the SDR digital processor into an analog signal to be transmitted.

The RF repeater may further include a controller configured to select a desired route between the interference cancellation digitizer and the SDR digitizer, perform setting with respect to frequency processing, select a route of the RF down-converter and a route of the RF up-converter, perform setting with respect to frequency processing, and to provide a variety of other controls, and a power supply configured to supply power to each part in a system.

According to example embodiments of the invention, by selecting a device suitable for a frequency environment of an installation site, a quality of communication service may be improved, irrespective of restrictions in the frequency environment.

According to example embodiments of the invention, technology can be provided that may secure a relatively wide service radius, by selecting an SDR device suitable for channel setting in a complex frequency environment when a repeater is installed, for example, in an urban frequency environment, in more complex environments where adjacent and non-adjacent signals coexist in a band, while selecting an interference cancellation device when the repeater is installed, for example, in a suburb, where a frequency environment may be relatively simple.

BRIEF DESCRIPTION OF THE DRAWINGS

These and/or other aspects, features, and advantages of the disclosure will become apparent and more readily appreciated from the following description of example embodiments, taken in conjunction with the accompanying drawings, of which.

DETAILED DESCRIPTION

Figure 1:
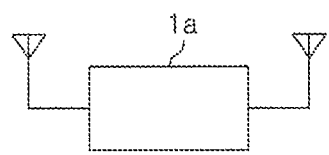
FIG. 1 is a diagram illustrating an interference cancellation repeater.

Hereinafter, example embodiments of the invention will be described in greater detail with reference to the accompanying drawings. Duplicate descriptions and detailed descriptions related to known functions and/or configurations which may make the purpose of the present disclosure unnecessarily complicated or ambiguous will be omitted here. The example embodiments are provided to more fully explain the present disclosure to those having ordinary knowledge in the art to which the present disclosure pertains. Accordingly, shapes and sizes of elements in the drawings may be exaggerated for the purpose of clarity.

The example embodiments may be modified in many different forms, and the scope of the present disclosure should not be construed as limited to the example embodiments set forth herein. Rather, these example embodiments are provided so that the present disclosure will be thorough and complete, and will fully convey the scope of the present disclosure to those skilled in the art.

Although reference numerals are used in the following description, they are used only to distinguish one element from another element. Further, it should be noted that if it is described in the specification that one element is "connected," "coupled," or "joined" to another element, the one element may be "directly connected," "directly coupled," or "directly joined" to the other element. However, unless otherwise specified, it should be understood that one or more intervening elements may also be present.

The terminologies used herein are used to appropriately describe the example embodiments, and thus may be changed depending on the particular user, on the intent of an operator, or on a particular custom.

Accordingly, the terminologies should be defined based on the following overall description of this specification. In addition, like reference numerals will refer to like elements throughout the description of the figures.

FIG. 1 is a diagram illustrating an existing general interference cancellation repeater 1a. The interference cancellation repeater 1a is a repeater that cancels oscillation occurring through a repetitive cycle process in which a signal output by amplifying an input signal is fed back as an input, such that the original input signal and the feedback signal are combined and amplified. In general, to prevent oscillation in a repeater, a gain of the repeater needs to be restricted to be at least 15 decibels (dB) lower than antenna isolation. The interference cancellation repeater 1a may set a higher gain by cancelling oscillation.

Figure 2:
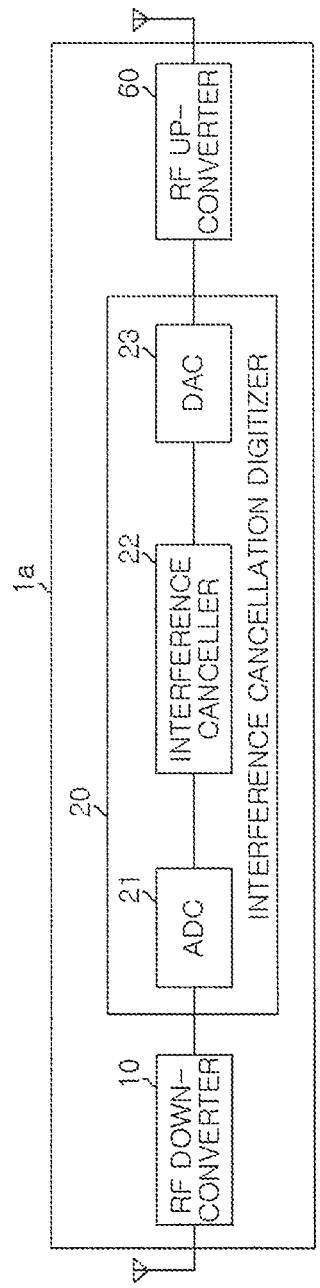
FIG. 2 is a diagram illustrating a configuration of the interference cancellation repeater of FIG. 1.

FIG. 2 is a diagram illustrating a configuration of the general interference cancellation repeater 1a from FIG. 1. When a radio frequency (RF) signal is received through an antenna, an RF down-converter 10 generates an intermediate frequency (IF) signal by performing frequency down-conversion with respect to the received RF signal. The generated IF signal is input into an analog-to-digital converter (ADC) 21, and converted into a digital signal by the ADC 21. The digital signal is input into an interference canceller 22, and a feedback signal is removed from the digital signal. The feedback-removed digital signal is input into a digital-to-analog converter (DAC) 23, and converted into an analog signal by the DAC 23. The analog signal is input into an RF up-converter 60. The RF up-converter 60 performs frequency up-conversion and amplification with respect to the input analog signal. The amplified signal is then output through another antenna.

Figure 3:
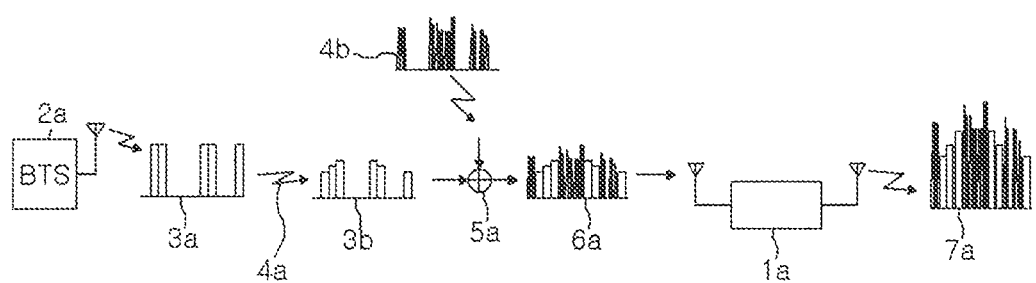
FIG. 3 is a diagram illustrating an example of applying a general interference cancellation repeater to a complex frequency environment.

FIG. 3 is a diagram illustrating an example of applying a general interference cancellation repeater to a complex frequency environment. Referring to FIG. 3, a service signal 3a of a base transceiver system (BTS) 2a that services five service channels is an example of a source signal that is serviced in a complex radio wave and frequency environment, for example, in a downtown area of a city. The service signal 3a is altered into a signal 3b, with a changed level for each service channel, for example, due to distortion caused by fading in a wireless section 4a.

The signal 3b is altered into a signal 6a, for example, after being mixed with interference from a frequency interference signal 4b which may include signals serviced by another provider and various adjacent interference signals, where the signals 3b, 4b are schematically mixed and/or synthesized at reference 5a, and the combined signal 6a is input into the interference cancellation repeater 1a. The interference cancellation repeater 1a amplifies the signal 6a, and outputs an amplified mixed signal 7a. The interference cancellation repeater 1a regards and processes the entire mixed signal 6a as an original reference signal, and amplifies the entire mixed signal 7a, from which oscillation is cancelled, without removing components of the frequency interference signal 4b. The amplified output signal therefore still includes the interference signals and the service signals together, and has a distortion level for each channel of the service signals. Thus, the existing general interference cancellation repeater 1a may not improve a quality of service and secure an adequate service radius in such complex radio wave and frequency environments.

Figure 4:
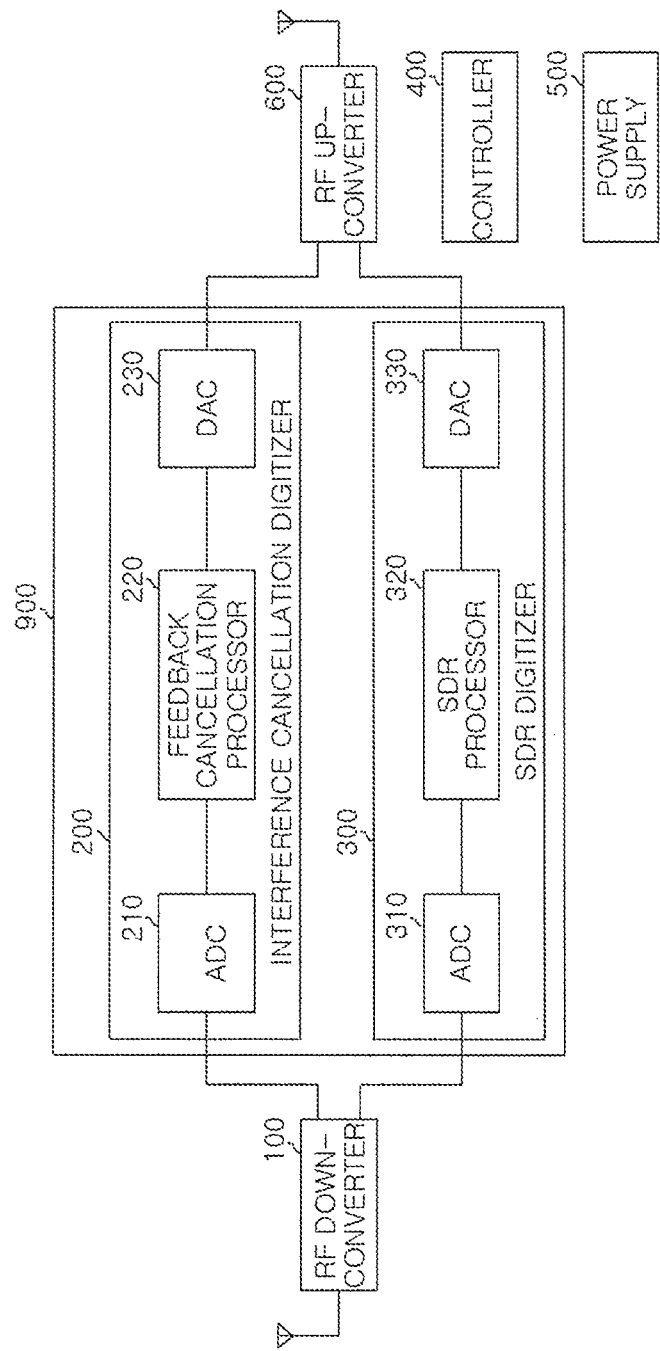
FIG. 4 is a diagram illustrating a radio frequency (RF) repeater according to an embodiment of the invention.

Meanwhile, FIG. 4 is a diagram illustrating an RF repeater according to an example embodiment of the invention.

Referring to the RF repeater in FIG. 4, an RF signal, for example, received from the BTS 2a undergoes frequency down-conversion through an RF down-converter 100, and is transmitted to either an interference cancellation digitizer 200 or a software-defined radio (SDR) digitizer 300 of a digitizer 900. When a route to the interference cancellation digitizer 200 is selected by a controller 400, an ADC 210 of the interference cancellation digitizer 200 converts the received signal into a digital signal, and a feedback cancellation processor 220 cancels feedback interference from the digital signal. A DAC 230 converts the interference-cancelled digital signal into an analog signal and transmits the analog signal to an RF up-converter 600. Meanwhile, when a route to the SDR digitizer 300 is instead selected by the controller 400, the output signal of the RF down-converter 100 is transmitted to an ADC 310 of the SDR digitizer 300 instead. The ADC 310 converts the received signal into a digital signal. An SDR processor 320 performs channel filtering, for example, through an internal channel filter, and then performs equalization, for example, by adjusting a level for each channel through an internal equalizer. The equalized signal can then be transmitted to a DAC 330 of the SDR digitizer 300. The DAC 330 converts the received signal into an analog signal, and transmits the analog signal to the RF up-converter 600. When one of the route to the interference cancellation digitizer 200 or the route to the SDR digitizer 300 is selected by the controller 400, the RF up-converter 600 performs frequency up-conversion and level amplification with respect to the received signal, and outputs the amplified signal through an antenna.

Operation of the channel filter discussed above may be set through a control program linked with the controller 400, for example, to select a channel to be filtered, to set a bandwidth, and to select a roll-off value.

Operation of the equalizer discussed above may also be set through the control program linked with the controller 400, for example, to determine whether levels are to be equalized based on a level of a lowest-level channel, on a highest level, or on a reference value desired for each channel.

Figure 5:
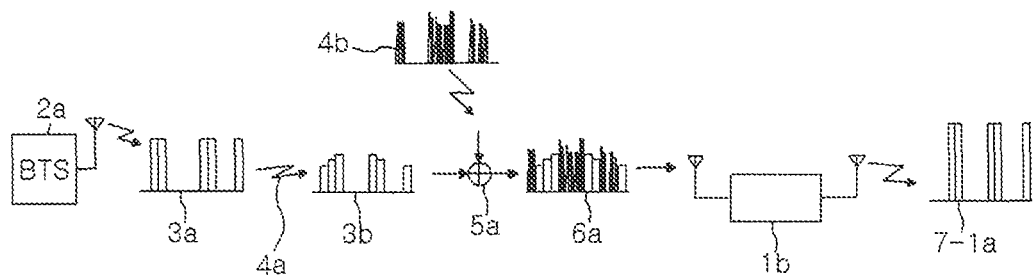
FIG. 5 is a diagram illustrating an example of applying an RF repeater in a complex frequency environment according to an example embodiment.

FIG. 5 is a diagram illustrating an example of applying an RF repeater in a complex frequency environment according to an example embodiment of the invention.

As was seen, for example, in FIG. 3, the general interference cancellation repeater 1*a* regards and treats the mixed signal 6*a* as the original reference signal, amplifies the entire mixed signal 6*a*, from which oscillation is cancelled, and outputs the mixed signal 7*a* without properly filtering the frequency interference signal 4*b*. However, an improved RF repeater 1*b* of FIG. 5 can instead output a signal 7-1*a* with a uniform level for each channel by removing components of the frequency interference signal 4*b* and equalizing the channels, thereby improving quality of service.

Figure 6:
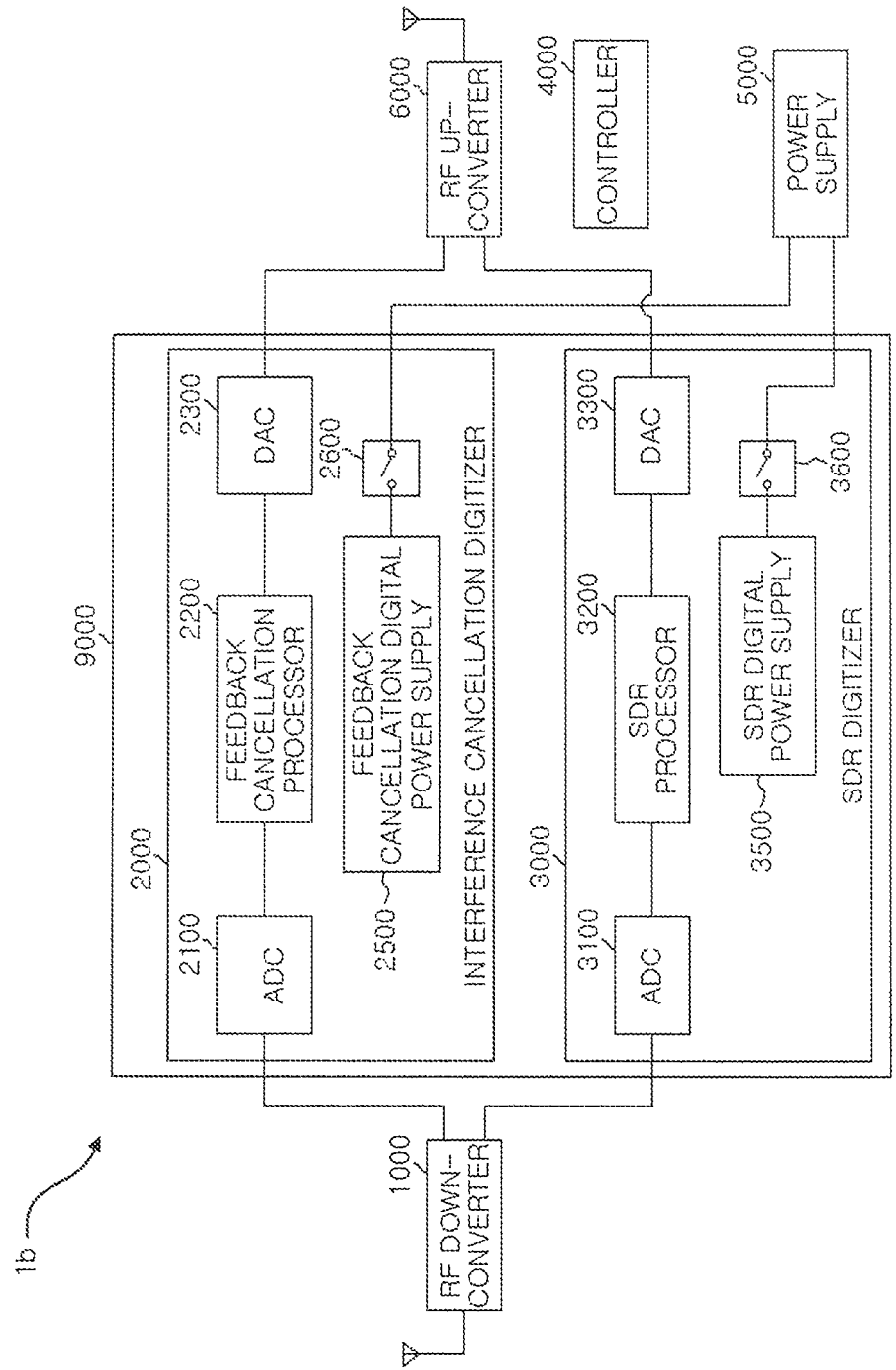
FIG. 6 is a diagram illustrating a configuration of an RF repeater according to another embodiment of the invention.

FIG. 6 is a diagram illustrating a configuration of an RF repeater according to an example embodiment.

The RF repeater 1*b* includes an RF down-converter 1000 that is configured to perform frequency down-conversion and gain control with respect to an RF signal received from a BTS and to transmit the signal to either an interference cancellation digitizer 2000 or an SDR digitizer 3000 of a digitizer 9000, the aforementioned interference cancellation digitizer 2000 and SDR digitizer 3000 of the digitizer 9000, an RF up-converter 6000 configured to perform frequency up-conversion and gain control, a controller 4000, and a power supply 5000.

The interference cancellation digitizer 2000 includes an ADC 2100, a feedback cancellation processor 2200 configured to cancel feedback interference, a DAC 2300, a feedback cancellation digital power supply 2500 configured to supply power to the interference cancellation digitizer 2000, and an interference cancellation power switch 2600 configured to interrupt power to the interference cancellation digital power supply 2500.

The SDR digitizer 3000 includes an ADC 3100, an SDR processor 3200 configured to perform channel filtering and equalization to a particular level for each channel, for example, based on user settings, a DAC 3300, an SDR digital power supply 3500 configured to supply power to the SDR digitizer 3000, and an SDR power switch 3600 configured to interrupt power to the SDR digital power supply 3500.

Figure 7:
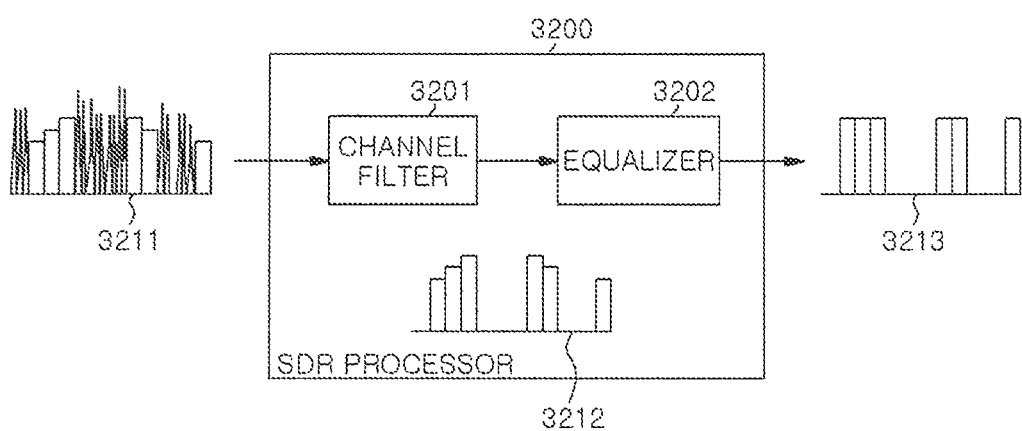
FIG. 7 is a diagram illustrating a software-defined radio (SDR) processor of an RF repeater according to an embodiment of the invention.

With respect to the SDR processor 3200 of the SDR digitizer 3000, FIG. 7 is a diagram illustrating an example embodiment of the SDR processor 3200. The SDR processor 3200 receives a signal 3211 which may include frequency interference. For example, the signal 3211 may be the signal 6*a* which includes interference from the frequency interference signal 4*b*. A channel filter 3201 may perform channel filtering on the signal 3211, generating one or more filtered signals 3212 at one or more respective channels. Operation of the channel filter may be set through a control program linked with a controller, such as the controller 4000 of FIG. 6, for example, to select a channel to be filtered, to set a bandwidth, and to select a roll-off value. An equalizer 3202 may perform equalization of the filtered signal 3212 by adjusting the level of one or more channels of the filtered signal 3212, thereby generating an equalized signal 3213. Operation of the equalizer may also be set through the control program linked with the controller, such as the controller 4000 of FIG. 6, for example, to determine whether levels are to be equalized based on a level of a lowest-level channel, on a highest level, or on a reference value desired for each channel.

Referring now back to FIG. 6, the interference cancellation power switch 2600 and the SDR power switch 3600 are switches to be controlled based on one or more respective control signals, and are connected to the power supply 5000 for power. The interference cancellation power switch 2600 and the SDR power switch 3600 are interrupted, for example, based on user settings through the controller 4000 via control lines that may be electrically connected to the controller 4000. When a user selects use of the interference cancellation digitizer 2000, the interference cancellation power switch 2600 is turned on. Meanwhile, when the user selects use of the SDR digitizer 3000, the SDR power switch 3600 is turned on.

The interference cancellation digitizer 2000 and the SDR digitizer 3000 are electrically connected to the controller 4000. Thus, set values thereof may be changed based on user settings, and power interruption may also be controlled, via the controller 4000.

Figure 8A:
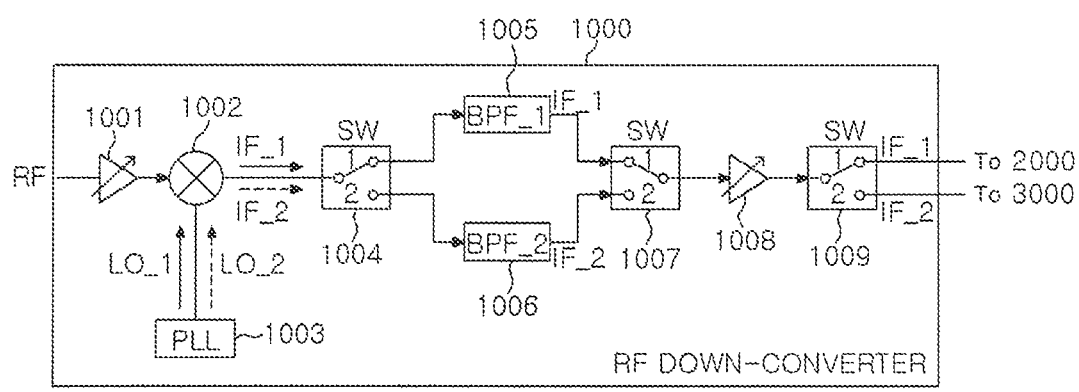
FIGS. 8A, 8B, and 8C are diagrams illustrating configurations of RF down-converters according to embodiments of the invention.

Various different embodiments of RF down-converters will now be discussed, with reference to FIGS. 8A to 8C. Referring first to the RF down-converter 1000 of FIG. 8A, an RF gain controller 1001 performs low-noise amplification and gain control with respect to an RF signal received from the BTS 2*a*, and transmits the RF signal to a mixer 1002. The mixer 1002 outputs an IF signal corresponding to a local oscillation (LO) frequency based on the LO frequency output from a phase lock loop (PLL) 1003 that can be controlled by user settings through a control signal from the controller 400. In this example, when a user sets the interference cancellation digitizer 2000 to operate through the controller 4000, the PLL 1003 outputs an LO_1 frequency signal and the mixer 1002 outputs a corresponding IF_1 signal. On the other hand, when the user sets the SDR digitizer 3000 to operate through the controller 4000, the PLL 1003 outputs an LO_2 frequency signal and the mixer 1002 outputs a corresponding IF_2 signal.

When the interference cancellation digitizer 2000 is selected through the controller 4000 based on the user settings, switches 1004, 1007, and 1009 each operates at or connects to a first contact point to complete a corresponding circuit for transmitting a signal to the interference cancellation digitizer 2000. When the SDR digitizer 3000 is selected, the switches 1004, 1007, and 1009 each operates at or connects to a second contact point to complete a corresponding alternate circuit for transmitting a signal to the SDR digitizer 3000 instead.

A band-pass filter (BPF) then performs filtering. When the interference cancellation digitizer 2000 is selected, the IF_1 signal output from the mixer 1002 is filtered through a BPF_1 1005. When the SDR digitizer 3000 is selected, the IF_2 signal output from the mixer 1002 is instead filtered through a BPF_2 1006.

The IF signal passing through the BPF 1005 or 1006 then undergoes gain amplification and control through a gain controller 1008, and is output via a route selected using the switch 1009.

The BPF 1005 or 1006 may be omitted if a particular implementation renders one or both BPFs unnecessary.

Figure 8B:
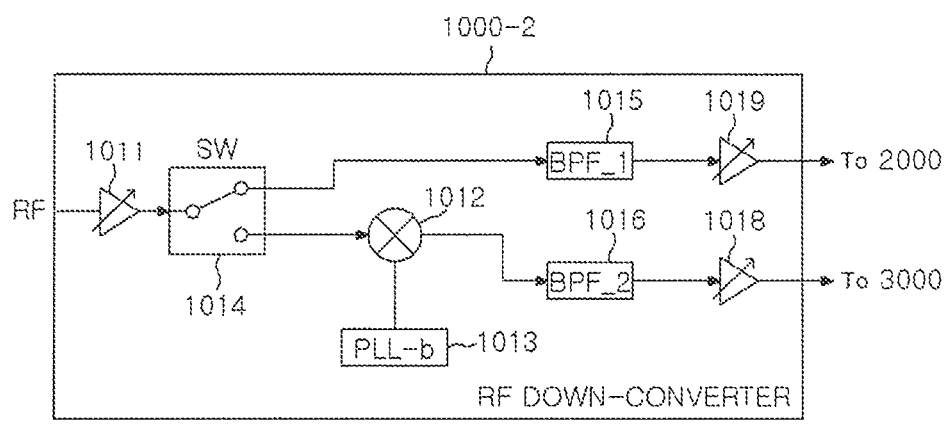
Figure 8C:
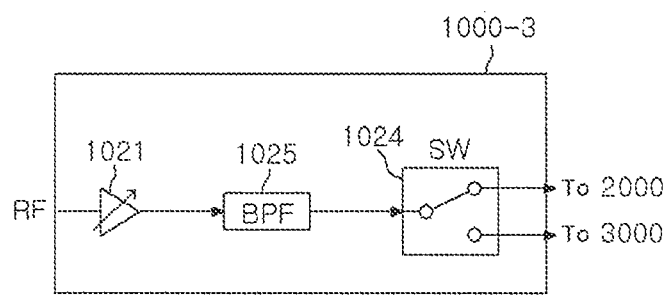

In other examples of RF down-converters, such as those depicted in FIGS. 8B and 8C, rather than a scheme or arrangement where an RF signal is converted temporarily to an intermediate frequency signal, a direct conversion scheme in which an RF signal is input directly into the interference cancellation digitizer 2000 or the SDR digitizer 3000 may be used instead, depending on an implementation situation of the digitizer 9000. At least one route from each of the RF down-converters 1000-2 and 1000-3 to the corresponding digitizer 2000 or 3000 uses a direct conversion scheme that does not include a mixer and a PLL. For example, in the RF down-converter 1000-2 in FIG. 8B, a route is set by selecting the route using a switch 1014. Meanwhile, a route through RF down-converter 1000-2 corresponding to the interference cancellation digitizer 2000 uses a direct conversion scheme that does not include a mixer and a PLL, while a route corresponding to the SDR digitizer 3000 does include a mixer 1012 and a PLL-b 1013. In other embodiments, the configuration may be switched, so that a route through the RF down-converter corresponding to the interference cancellation digitizer 2000 may be the route that includes a mixer and a PLL, while a route corresponding to the SDR digitizer 3000 may instead use a direct conversion scheme without implementing a mixer and a PLL. In yet another example, shown in FIG. 8C, both of the routes in the RF down-converter 1000-3 corresponding respectively to the interference cancellation digitizer 2000 and the SDR digitizer 3000 use a direct conversion scheme, without implementation of any mixers or PLLs in the entire RF down-converter 1000-3.

Referring again back to FIG. 6, the RF up-converter 6000 performs frequency up-conversion and gain control with respect to the signals transmitted from either the DAC 2300 of the interference cancellation digitizer 2000 or the DAC 3300 of the SDR digitizer 3000, and outputs the corresponding signal through an antenna.

Figure 9A:
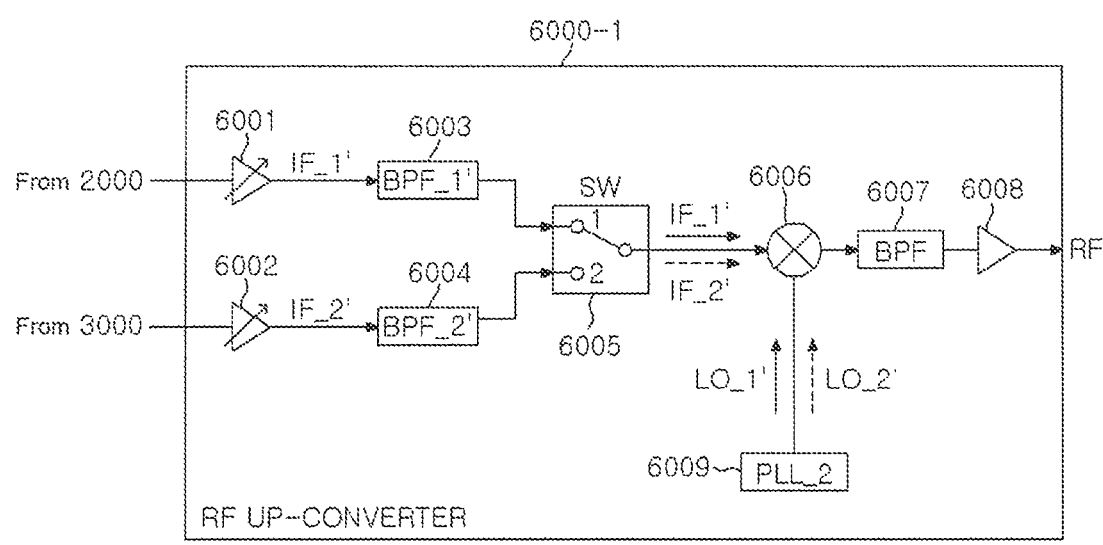
FIGS. 9A, 9B, and 9C are diagrams illustrating configurations of RF up-converters according to embodiments of the invention.

FIG. 9A illustrates an embodiment of an RF up-converter 6000-1. In detail, FIG. 9A illustrates an example of an RF up-converter 6000-1 that can be used together with, for example, the RF down-converter 1000 shown in FIG. 8A, and a digitizer where an input frequency of the ACD 2100 of the interference cancellation digitizer 2000 is equal to an output frequency of the DAC 2300, and where an input frequency of the ADC 3100 of the SDR digitizer 3000 is equal to an output frequency of the DAC 3300. In using the RF up-converter 6000-1 together with the RF down-converter 1000 from FIG. 8A, an output frequency of the DAC 2300 and an output frequency of the DAC 3300 will correspond to intermediate frequencies. Here, a signal IF_1' or IF_2' corresponding to a route selected by a user is respectively input through either the DAC 2300 of the interference cancellation digitizer 2000 or the DAC 3300 of the SDR digitizer 3000. If the signal IF_1' is received, it is filtered by a BPF 6003. If the signal IF_2' is received, it is filtered by a BPF 6004. A switch 6005 operates as a contact point for selecting the corresponding or appropriate route based on a control signal from the controller 4000, and a mixer 6006 performs frequency up-conversion with respect to the signal IF_1' or IF_2' into an RF signal based on an appropriately selected LO frequency signal provided from a phase-locked loop PLL_2 6009. If the user has selected the route corresponding to the interference cancellation digitizer 2000, the signal IF_1' is converted based on an LO frequency LO_1'. If the user has selected the route corresponding to the SDR digitizer 3000 the signal IF_2' is converted based on an LO frequency LO_2'. The RF up-converter 6000-1 then performs filtering utilizing a BPF 6007, gain amplification and level adjustment utilizing a buffer/amplifier or other controller or component 6008, and then outputs the corresponding filtered and adjusted signal.

Figure 9B:
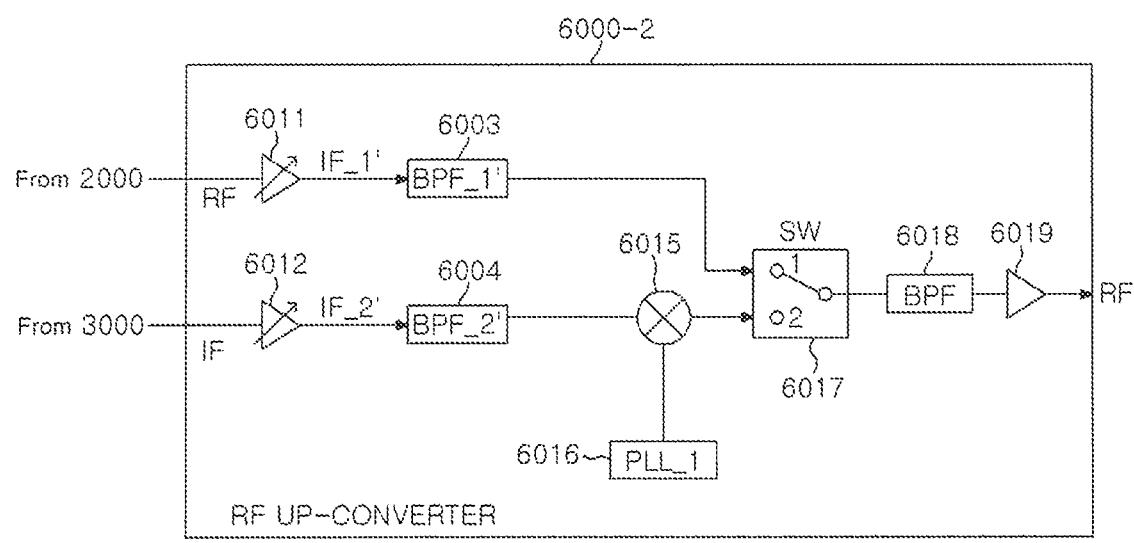

FIG. 9B illustrates an RF up-converter 6000-2. In detail, FIG. 9B illustrates an example in which an output frequency of the DAC 2300 of the interference cancellation digitizer 2000 is an RF signal equal to an input frequency of the RF down-converter 1000 (for example, in a case in which a frequency direct conversion scheme is used), while an output frequency of the DAC 3300 of the SDR digitizer 3000 is an IF signal. For example, the RF up-converter 6000-2 can be used together with the RF down-converter 1000-2 shown in FIG. 8B. Here, if a user selects the route corresponding to the interference cancellation digitizer 2000, processing of the signal will not include a mixer or a PLL, while if the user selects the route corresponding to the SDR digitizer 3000, processing of the signal will include further processing via mixer 6015 and PLL_1 6016 to convert an intermediate frequency signal back to an RF signal. The example of the RF up-converter 6000-2 shown in FIG. 9B may also be used in various other cases in which one of the output frequencies of the DAC 2300 of the interference cancellation digitizer 2000 or the DAC 3300 of the SDR digitizer 3000 is an IF, while the other one of the output frequencies is an RF.

Figure 9C:
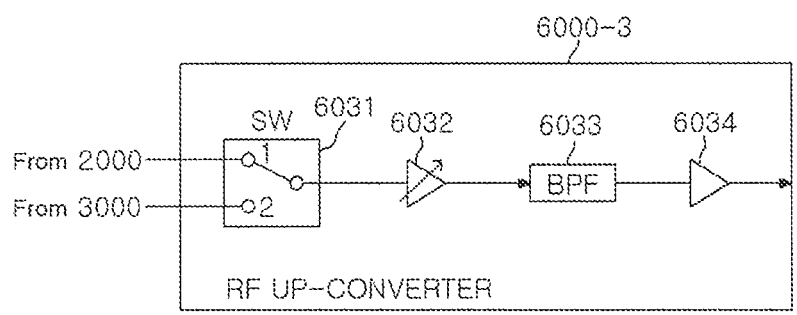

FIG. 9C illustrates an RF up-converter 6000-3. In detail, FIG. 9C illustrates an example in which the output frequencies of the DAC 2300 of the interference cancellation digitizer 2000 and the DAC 3300 of the SDR digitizer 3000 are both RF signals with frequencies that may be equal to an input frequency of the RF down-converter 1000. For example, the RF up-converter 6000-3 can be used together with the RF down-converter 1000-3 shown in FIG. 8C. In such an arrangement, processing of both signals from the interference cancellation digitizer 2000 and the SDR digitizer 3000 will not require additional processing via a mixer or PLL, and so those components have been omitted entirely from the RF up-converter 6000-3.

In the above embodiments, when a user selects either the interference cancellation digitizer 2000 or the SDR digitizer 3000 for operation through a control program, the controller 4000 can controls the corresponding power switch 2600 or 3600, controls a frequency and a route of the RF down-converter 1000, 1000-2, or 1000-3, and controls a frequency and a route of the RF up-converter 6000, 6000-1, 6000-2, or 6000-3, among other settings and configurations in the described embodiments.

In other embodiments, the various features discussed with respect to each embodiment above can be combined in various different ways. In still other embodiments, other modifications may be made, while still implementing the concepts and features discussed above with respect to the various example embodiments.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A radio frequency (RF) repeater comprising:
   an RF down-converter configured to process an input signal;
   a digitizer configured to perform digital processing of an output signal from the RF down-converter, the digitizer comprising an interference cancellation digitizer configured to perform feedback interference cancellation on the output signal from the RF down-converter and a software-defined radio (SDR) digitizer configured to perform digital channel filtering and/or channel equalization on the output signal from the RF down-converter;
   an RF up-converter configured to further process an output signal from the digitizer; and
   a controller configured to control the RF down-converter, the digitizer, and the RF up-converter.

2. The RF repeater of claim 1, wherein the interference cancellation digitizer and the SDR digitizer each comprises a corresponding controllable power switch, and wherein the digitizer is configured to select one of the interference cancellation digitizer or the SDR digitizer by turning on or off the corresponding power switch based on a control signal from the controller.

3. The RF repeater of claim 1, wherein the RF down-converter comprises:
   a phase lock loop configured to output a local oscillation (LO) frequency, wherein the controller is configured to control and set the LO frequency; and
   a mixer configured to convert an input frequency of the input signal that is input to the RF down-converter into an intermediate frequency (IF) for input into the interference cancellation digitizer or the SDR digitizer based on and using the LO frequency.

4. The RF repeater of claim 1, wherein the RF up-converter comprises:
   a phase lock loop configured to output a local oscillation (LO) frequency corresponding to either an output frequency of an output signal from the interference cancellation digitizer or an output frequency of an output signal from the SDR digitizer, wherein the controller is configured to control and set the LO frequency; and
   a mixer configured to utilize the set LO frequency to convert at least one of the output frequency of the output signal from the interference cancellation digitizer or the output frequency of the output signal from the SDR digitizer to a frequency that corresponds to the frequency, of the input signal that is input to the RF down-converter.

5. The RF repeater of claim 1, wherein the controller is configured to control the digital channel filtering of the SDR digitizer by selling at least one of a roll-off, a number of channels, a bandwidth of at least one channel, and a frequency of at least one channel.

6. The RF repeater of claim 1, wherein the controller is configured to control the channel equalization of the SDR digitizer by equalizing a channel level of at least one channel to a desired level.

7. The RF repeater of claim 1, wherein, when either the interference cancellation digitizer or the SDR digitizer is selected for operation through a control program, the controller is configured to turn on a power switch corresponding to the selected digitizer, and to control a frequency and a route of the RF down-converter and a frequency and a route of the RF up-converter.

8. The RF repeater of claim 4, further comprising a switch configured to select between a route corresponding to the interference cancellation digitizer or a route corresponding to the SDR digitizer.

9. The RF repeater of claim 3, further comprising a switch configured to select between a route corresponding to the interference cancellation digitizer or a route corresponding to the SDR digitizer.

10. The RF repeater of claim 1, wherein the RF down-converter is configured to perform low-noise amplification, frequency down-conversion, and gain control, and wherein the RF up-converter is configured to perform frequency up-conversion and gain control.

11. The RF repeater of claim 1, wherein the RF down-converter is configured with a first route for outputting signals to the interference cancellation digitizer and a second route for outputting signals to the SDR digitizer, wherein one of the first or second routes is configured to use a direct conversion scheme where an RF signal is output directly to the digitizer, and the other one of the first or second routes is configured to use an IF scheme where an RF signal is converted to an intermediate frequency for outputting to the digitizer, and wherein either the first or second route is selected with a switch.

12. The RF repeater of claim 1, wherein the RF up-converter is configured with a first route for receiving signals from the interference cancellation digitizer and a second route for receiving signals from the SDR digitizer, wherein one of the first or second routes is configured to use a direct, conversion scheme where an RF signal is received directly from the digitizer, and the other one of the first or second routes is configured to use an IF scheme wherein a signal at an intermediate frequency is received from the digitizer and is converted to an RF signal, and wherein either the first or second route is selected with a switch.

13. The RF repeater of claim 1, wherein the entire RF down-converter is configured to use a direct conversion scheme where an RF signal is output directly to the digitizer.

14. The RF repeater of claim 1, wherein the entire RF up-converter is configured to use a direct conversion scheme where an RF signal is received directly from the digitizer for further processing.

15. The RF repeater of claim 1, further comprising a power supply configured to supply power to the RF down-converter, the digitizer, the RF up-converter, and the controller.

* * * * *